(12) United States Patent
Chen et al.

(10) Patent No.: US 12,474,325 B2
(45) Date of Patent: Nov. 18, 2025

(54) POROUS HOLLOW FIBER MEMBRANE AND METHODS OF USING IT TO SELECT IMMUNE CHECKPOINT INHIBITOR

(71) Applicant: TAIPEI MEDICAL UNIVERSITY, Taipei (TW)

(72) Inventors: Chien Chung Chen, Taipei (TW); Chee Ho Chew, New Taipei (TW); Wan Ting Huang, Taipei (TW); Yun Tsao, Taipei (TW)

(73) Assignee: TAIPEI MEDICAL UNIVERSITY, Taipei (TW)

( * ) Notice: Subject to any disclaimer, the term of this patent is extended or adjusted under 35 U.S.C. 154(b) by 1055 days.

(21) Appl. No.: 17/599,531

(22) PCT Filed: Mar. 30, 2020

(86) PCT No.: PCT/CN2020/082194
§ 371 (c)(1),
(2) Date: Sep. 28, 2021

(87) PCT Pub. No.: WO2020/200180
PCT Pub. Date: Oct. 8, 2020

(65) Prior Publication Data
US 2022/0155283 A1    May 19, 2022

Related U.S. Application Data (60) Provisional application No. 62/826,677, filed on Mar. 29, 2019.

(51) Int. Cl.
| | | |
|---|---|---|
| *G01N 33/50* | (2006.01) | |
| *C12N 5/078* | (2010.01) | |
| *C12N 5/09* | (2010.01) | |
| *D01D 5/00* | (2006.01) | |
| *D01D 5/24* | (2006.01) | |
| *D04H 1/728* | (2012.01) | |

(52) U.S. Cl.
CPC ....... *G01N 33/5011* (2013.01); *C12N 5/0634* (2013.01); *C12N 5/0693* (2013.01); *D01D 5/0007* (2013.01); *D01D 5/24* (2013.01); *D04H 1/728* (2013.01); *G01N 33/5047* (2013.01); *C12N 2502/11* (2013.01); *C12N 2502/30* (2013.01); *C12N 2533/90* (2013.01)

(58) Field of Classification Search
None
See application file for complete search history.

(56) References Cited

U.S. PATENT DOCUMENTS

| | | | |
|---|---|---|---|
| 9,139,935 B2 * | 9/2015 | Chen | D01D 5/0069 |
| 9,713,521 B2 * | 7/2017 | Chen | A61F 2/02 |
| 2011/0264235 A1 | 10/2011 | Chen et al. | |

FOREIGN PATENT DOCUMENTS

| | | | |
|---|---|---|---|
| CN | 109504659 A | | 3/2019 |
| JP | 2008011797 A | * | 1/2008 |

OTHER PUBLICATIONS

Hollingshead et al. Volume 57, Issue 2, Jun. 2, 1995, pp. 131-141 https://doi.org/10.1016/0024-3205(95)00254-4 (Year: 1995).*
Courau et al. Journal for Immuno Therapy of Cancer vol. 7, Article No. 74 (2019) Published: Mar. 14, 2019 (Year: 2019).*
Zia Sherrell, MedicalNews Today (retrieved online https://www.medicalnewstoday.com/articles/cd4-t-cells on Feb. 19, 2025). (Year: 2023).*
Cytion MC38 Cells (retrieved online https://www.cytion.com/us/MC38-Cells/305223 on Feb. 19, 2025). (Year: 2025).*
ATCC, HT-29 (retrieved online https://www.atcc.org/products/htb-38#:~: text=HT%2D29%20is%20an%20adherent,in%20cancer%20and%20drug%20research on Feb. 19, 2025) (Year: 2025).*
Electrospin Tech, Published date: Aug. 23, 2012 (retrieved online https://electrospintech.com/stack-layers.html on Feb. 19, 2025) (Year: 2012).*
Tseng et al. Materials 2019, 12(4), 569; https://doi.org/10.3390/ma12040569 Published: Feb. 14, 2019 (Year: 2019).*
Mi et al. J Biomed Mater Res A. Feb. 2015 ; 103(2): 593-603. doi: 10.1002/jbm.a.35208 (Year: 2015).*
Chakrabarti et al. Epithelial Cell Culture: Methods and Protocols, Methods in Molecular Biology, vol. 1817, https://doi.org/10.1007/978-1-4939-8600-2_16 (Year: 2018).*
Aref et al., "3D microfluidic ex vivo culture of organotypic tumor spheroids to model immune checkpoint blockade", Lab on a Chip, vol. 18, 2018, pp. 3129-3143.
First Office Action issued on Apr. 27, 2021, in Taiwan Patent Application No. 109110903. English summary included.
Second Office Action issued on Oct. 14, 2021, in Taiwan Patent Application No. 109110903. English summary Included.

* cited by examiner

*Primary Examiner* — Gregory S Emch
*Assistant Examiner* — Fernando Ivich
(74) *Attorney, Agent, or Firm* — Prosyla Group, PC (57) ABSTRACT

The present invention provides a porous hollow fiber membrane and methods of using the membrane to select an immune checkpoint inhibitor. The membrane can be used in animal models with an immune system and using a low-cost common mouse. The host immune system is unable to attack the cancer cells within the membrane and an animal study proves that the membrane system can be performed within animals.

21 Claims, 8 Drawing Sheets

| OM | Overlay with DAPI |
|---|---|
|  |  |
| Anti-E-cadherin Antibody for Adhesion cells | CD45 antibody for suspension cells |
|  |  |

(B)

| OM | Overlay with DAPI |
|---|---|
|  |  |
| Anti-E-cadherin Antibody for Adhesion cells | CD45 antibody for suspension cells |
|  |  |

POROUS HOLLOW FIBER MEMBRANE AND METHODS OF USING IT TO SELECT IMMUNE CHECKPOINT INHIBITOR

PRIORITY DATA

This application is a 371 National Phase of International Patent Application No. PCT/CN2020/082194, filed Mar. 30, 2020, which claims priority to and benefit of Priority Patent Application No. 62/826,677, filed Mar. 29, 2019, the contents of which is incorporated by reference in its entirety.

FIELD OF THE INVENTION

The present invention relates to an evaluation of effectiveness of an immune checkpoint inhibitor. Particularly, the present invention pertains to identification of an effective immune checkpoint inhibitor using an electrospinning fiber tube.

BACKGROUND OF THE INVENTION

Cancer immune therapy is a rapidly developing field that has yielded impressive and promising breakthroughs. The basis for immunotherapy is the manipulation and/or modulation of the immune system, including both innate immune responses and adaptive immune responses. Under normal conditions, immune checkpoints are necessary to maintain a balance between activating and inhibitory signals and to ensure the development of an effective immune response while safeguarding against the development of autoimmunity or damage to tissues when the immune system is responding to a foreign or pathogenic agent. An important immune checkpoint receptor is CTLA-4 which is expressed on T-cells and is highly expressed on regulatory T-cells (Tregs). CTLA-4 is considered to act as an inhibitory molecule or an immune response "brake" and primarily regulates the amplitude of T-cell activation. Another important immune checkpoint receptor is PD-1 which is expressed on T-cells after activation, is highly expressed on Tregs, and is expressed on other activated cells including B-cells and natural killer (NK) cells. Similar to CTLA-4, PD-1 is considered to act as an inhibitory molecule and a "brake" on the immune response.

The first clinical successes of agents that modulate cancer immunity have validated cancer immunotherapy as a novel path to obtain durable and long-lasting clinical responses in cancer patients. The first such agent, ipilimumab (Yervoy, BMS), that obtained marketing approval for treatment of metastatic melanoma is an antibody blocking the CTLA4 receptor, an immune checkpoint protein. Further immune checkpoint inhibitors under development are antibodies that block the interaction between the PD-1 receptor and its ligands PD-L1 and PD-L2. Several antibodies targeting the PD-1 pathway are currently in clinical development for treatment of melanoma, renal cell cancer, non-small cell lung cancer, diffuse large B cell lymphoma and other tumors. However, treatment with immune checkpoint blockade has a lower response rate.

Immunotherapeutic evaluation faces many challenges from the earliest stages of drug development. Many in vitro assays have been developed to screen and evaluate the efficacy of immune cell-mediated killing. However, there is a great gap between the in vitro assay results and the clinical outcomes. Moreover, a number of in vivo animal models are developed to evaluate the effectiveness of immune checkpoint inhibitors. However, it normally takes a long time, needs specific mice (such as immunodeficient animals and humanized mice) and a number of laboratory mice to complete an in vivo assay. Although U.S. Pat. No. 5,676,924 provides a method of determining the effectiveness of a cancer treatment by sealing tumor cells in segments of semipermeable membrane hollow fibers, implanting the sealed fiber segments in a mammal, treating the mammal with a cancer treatment, and evaluating the effect of the cancer treatment on the cells in the hollow fiber segments. The method disclosed in U.S. Pat. No. 5,676,924 is not appropriate in evaluation of a compound in immune response.

Since it is difficult to predict therapeutic effectiveness of immune checkpoint inhibitors, accordingly, there is a great need to identify immune checkpoint inhibitors useful for diagnostic and therapeutic purposes.

SUMMARY OF THE INVENTION

The present disclosure provides a method of selecting an immune checkpoint inhibitor in vivo, comprising (a) in vitro co-culturing adherent tumor cells and suspension immune cells within lumens of microtube array membrane (MTAM), wherein the MTAM comprises one or more layers of electrospun fiber assembly having highly aligned and closely packed hollow fibers with nano-size; (b) transplanting the membrane into a non-human animal; and (c) administering an immune checkpoint inhibitor to the non-human animal; (d) separating the tumor cells and the immune cells; and (e) determining a cell viability of the tumor cells or the activity of the immune cells or determining immune checkpoint protein expression in the tumor or immune cells; wherein the immune checkpoint inhibitor has an anti-tumor effect if the cell viability of the tumor cells is significantly lower than that of the control or the activity of the immune cells is significantly higher than that of the control; or if the immune checkpoint protein expression in the tumor or immune cells is changed relative to the control.

In one embodiment, the fibers have nanoscale hair like structures extended from inner surface thereof. In some embodiment, the hairy like structure has a length ranging from 100 nm to 1 μm or the hairy like structure has an aspect ratio of up to 15:1. In another embodiment, the surface coverage of the hair-like structure is about 10% to about 80%.

In certain embodiments, the adherent tumor cells or the suspension immune cells are seeded at a concentration of about $1\times10^4$ cells/μl to $1\times10^7$ cells/μl. Certain embodiments of the adherent tumor cells comprise cells of hepatocellular carcinoma, colorectal carcinoma, glioblastoma, gastric cancer, esophageal cancer, non-small cell lung cancer (NSCLC), pancreatic cancer, renal cell carcinoma, benign prostate hyperplasia, prostate cancer, ovarian cancer, melanoma, breast cancer, chronic lymphocytic leukemia (CLL), Merkel cell carcinoma, small cell lung cancer (SCLC), Non-Hodgkin lymphoma, acute myeloid leukemia (AML), gallbladder cancer and cholangiocarcinoma, urinary bladder cancer, and uterine cancer. Certain embodiments of the suspension immune cells comprise peripheral blood mononuclear cells (PBMCs), lymphocytes, T lymphocytes, T cells, T helper cells, monocytes, natural killer (NK) cells, macrophages, and granulocytes.

Certain embodiments of the non-human animal comprise a rodent (such as murine), a rabbit, a dog, a pig and a monkey.

In some embodiments, the immune checkpoint inhibitor comprises an antibody (e.g., a monoclonal antibody, chimeric antibody, humanized antibody and human antibody), an engineered binding protein, a soluble receptor, an aptamer, a peptide, or a small molecule that binds to an immune checkpoint protein.

In one embodiment, the in vitro co-culturing of step (a) takes about 1 to about 2 days. In one embodiment, the administration of an immune checkpoint inhibitor in step (c) is conducted after about 1 to about 3 days of the transplantation of step (b). In one embodiment, the cell viability of tumor cells or the activity of immune cells or the immune checkpoint protein expression is determined after about 8 to about 15 days of the administration of step (c).

The present disclosure further provides a method of selecting an immune checkpoint inhibitor in vitro, comprising (a) in vitro co-culturing adherent tumor cells and suspension immune cells within lumens of fibers of the MTAM; (b) adding an immune checkpoint inhibitor to the membrane; (c) separating the tumor cells and the immune cells and determining a cell viability of the tumor cells or the activity of the immune cells or determining immune checkpoint protein expression in the tumor or immune cells; wherein the immune checkpoint inhibitor has an anti-tumor effect if the cell viability of the tumor cells is significantly lower than that of the control or the activity of the immune cells is significantly higher than that of the control; or if the immune checkpoint protein expression in the tumor or immune cells is changed relative to the control.

BRIEF DESCRIPTION OF THE DRAWING

FIG. 1 (A) to (H) show the cell viability of the cells. A549 cells cultured in TCP (A) and membrane lumens (B) increases depending on culture days and the addition of the anti-PD-1 drug did not affect cell viability ($p>0.05$). The cell viability of PBMC cells cultured in TCP (C) and membrane lumens (D) decreases depending on culture days and the addition of the anti-PD-1 drug did not affect cell viability. A549 cells and inactivated T cells were co-cultured in TCP (E) and the growth thereof is similar to that of the control. A549 cells and inactivated T cells co-cultured in the membrane exhibit similar results (F). A549 cells and activated T cells were co-cultured in TCP (G) and the growth thereof is similar to that of the control (one type of cell). The cell viability of the co-culture on the fifth day reduces by around 14% (no addition of anti-PD-1 drug) and around 31% (addition of anti-PD-1 drug) in comparison with the control. A549 cells and activated T cells co-cultured in the membrane (H) exhibit reduced cell viability by around 19% (no addition of anti-PD-1 drug) and around 70% (addition of anti-PD-1 drug), respectively.

FIGS. 6 (A) and (B) show that the adherent tumor cells (A549) were stayed on the inner wall of the fibers of the membrane (A) and suspension cells (PBMC) were isolated (B).

FIG. 7 (A) to (D) show cancer cell co-culture with naïve or activate PBMC treated with anti-PD1 antibody.

DETAILED DESCRIPTION OF THE INVENTION

When describing this invention including its various aspects and embodiments, the following terms have the following meanings, unless otherwise indicated.

The term "a" and "an" refers to one or to more than one (i.e., to at least one) of the grammatical object of the article. By way of example, "an element" means one element or more than one element.

The term "microtube array membrane" (abbreviated as "MTAM") refers to a film or membrane comprising electrospun fiber assembly having highly aligned and closely packed hollow fibers with nano-size.

The term "antibody," as used herein, refers to a protein, or polypeptide sequence derived from an immunoglobulin molecule which specifically binds with an antigen. Antibodies can be polyclonal or monoclonal, multiple or single chain, or intact immunoglobulins, and may be derived from natural sources or from recombinant sources. Antibodies can be tetramers of immunoglobulin molecules.

The term "anti-cancer effect" refers to a biological effect which can be manifested by various means, including but not limited to, e.g., a decrease in tumor volume, a decrease in the number of cancer cells, a decrease in the number of metastases, an increase in life expectancy, decrease in cancer cell proliferation, decrease in cancer cell survival, or amelioration of various physiological symptoms associated with the cancerous condition. An "anti-cancer effect" can also be manifested by the ability of the peptides, polynucleotides, cells and antibodies in prevention of the occurrence of cancer in the first place. The term "anti-tumor effect" refers to a biological effect which can be manifested by various means, including but not limited to, e.g., a decrease in tumor volume, a decrease in the number of tumor cells, a decrease in tumor cell proliferation, or a decrease in tumor cell survival.

The term "effective amount" or "therapeutically effective amount" are used interchangeably herein, and refer to an amount of a compound, formulation, material, or composition, as described herein effective to achieve a particular biological result.

An "immune response" refers to the action of a cell of the immune system (for example, T lymphocytes, B lymphocytes, natural killer (NK) cells, macrophages, eosinophils, mast cells, dendritic cells and neutrophils) and soluble macromolecules produced by any of these cells or the liver (including antibodies, cytokines, and complement) that results in selective targeting, binding to, damage to, destruction of, and/or elimination from a vertebrate's body of invading pathogens, cells or tissues infected with pathogens, cancerous or other abnormal cells, or, in cases of autoimmunity or pathological inflammation, normal human cells or tissues.

The term "immune checkpoint protein" is known in the art. Within the known meaning of this term it will be clear to the skilled person that on the level of "immune checkpoint proteins" the immune system provides inhibitory signals to its components in order to balance immune reactions. Known immune checkpoint proteins may comprise CTLA-4, PD1 and its ligands PD-L1 and PD-L2 and in addition LAG-3, BTLA, B7H3, B7H4, TIM3, MR. The pathways involving LAG3, BTLA, B7H3, B7H4, TIM3, and MR are recognized in the art to constitute immune checkpoint pathways similar to the CTLA-4 and PD-1 dependent pathways (see e.g. Pardoll, 2012. Nature Rev Cancer 12:252-264; Mellman et al., 2011. Nature 480:480-489).

The term "cancer" refers a broad group of various diseases characterized by the uncontrolled growth of abnormal cells in the body. Unregulated cell division and growth results in the formation of malignant tumors that invade neighboring tissues and may also metastasize to distant parts of the body through the lymphatic system or bloodstream. A "cancer" or "cancer tissue" can include a tumor.

The term "dosing interval," as used herein, means the amount of time that elapses between multiple doses of a formulation disclosed herein being administered to a subject. Dosing interval can thus be indicated as ranges.

The term "dosing frequency" as used herein refers to the frequency of administering doses of a formulation disclosed herein in a given time. Dosing frequency can be indicated as the number of doses per a given time, e.g., once a week or once in two weeks.

The term "biomaterial" refers to any natural or man-made material, that is composed of or is derived from, in whole or in part, living matter which performs, augments, or replaces a natural function, such as a polymer scaffolding perfused with cells or cell extracts.

The term "cell line" refers to cells of a particular type that can be maintained and grown in culture. Cell lines typically are homogeneous and well characterized, and can be stored (e.g. cryopreserved) for long periods of time. Certain cell lines may have a finite life span, while others may divide indefinitely.

The term "in vivo" refers to experiments methods or processes that are performed or occur within the body of an organism, such as in animals in human clinical trials or treatments.

As used herein, the term "electrospinning" refers to a technology which produces nano-sized fibers referred to as electrospun fibers from a solution using interactions between fluid dynamics and charged surfaces. In general, formation of the electrospun fiber involves providing a solution to an orifice in a body in electric communication with a voltage source, wherein electric forces assist in forming fine fibers that are deposited on a surface that may be grounded or otherwise at a lower voltage than the body. In electrospinning, a polymeric solution or melt provided from one or more needles, slots or other orifices is charged to a high voltage relative to a collection grid. Electrical forces overcome surface tension and cause a fine jet of the polymeric solution or melt to move towards the grounded or oppositely charged collection grid.

As used herein, the term "polymer" refers to and generally includes, but is not limited to, homopolymers, copolymers, such as, for example, block, graft, random and alternating copolymers, terpolymers, etc. and blends and modifications thereof. Preferably, it can include, but are not limited to, polylactides, polylactic acids, polyolefins, polyacrylonitrile, polyurethane, polycarbonate, polycaprolactone, polyvinyl alcohol (PVA), cellulose, chitosan nylon (e.g., nylon 6, nylon 406, nylon 6-6, etc.), polystyrene, proteins, and the like, or combinations thereof. Unless otherwise specifically limited, the term "polymer" is intended to include all possible geometrical configurations of the material. These configurations include, but are not limited to, isotactic, syndiotactic and random symmetries. Suitable solvents for each polymer can be selected from solvents known to those skilled in the art, including, but not limited to, sulfuric acid, formic acid, chloroform, tetrahydrofuran, dimethyl formamide, water, acetone, and combinations thereof.

As used herein, the term "nano-sized fibers" or "nanofibers" refers to very small diameter fibers having an average diameter not greater than about 1500 nanometers (nm). Nanofibers are generally understood to have a fiber diameter range of about 10 to about 1500 nm, more specifically about 10 to about 1000 nm, more specifically still about 20 to about 500 nm, and most specifically about 20 to about 400 nm. Other exemplary ranges include about 50 to about 500 nm, about 100 to 500 nm, or about 40 to about 200 nm. In instances where particulates are present and heterogeneously distributed on nanofibers, the average diameter of a nanofiber can be measured using known techniques (e.g., image analysis tools coupled with electro microscopy), but excluding the portions of a fiber that are substantially enlarged by the presence of added particles relative to the particle free portions of the fiber.

As used herein, the term "oriented fibers" indicates that substantially all fibers in a specific structure or array are arranged parallel to each other in a longitudinal direction ("unidirectionally oriented") or in a well-defined three-dimensional network ("three-dimensionally oriented"). In other words, the fibers are not randomly spatially arranged with respect to each other. In most instances, the fibers described herein grow in a generally perpendicular direction relative to the supporting substrate surface and there is very minimal, if any, branching of individual fiber strands.

As used herein, the term "single layer of material" or "single-layered material" refers to a material composed of a single layer which can be variable in thickness.

As used herein, the term "plurality of layers" or "multi-layered material" refers to a "stack" of single-layered materials.

The present invention provides a method of selecting an immune checkpoint inhibitor in vivo, comprising (a) in vitro co-culturing adherent tumor cells and suspension immune cells within lumens of microtube array membrane (MTAM), wherein the MTAM comprises electrospun fiber assembly having highly aligned and closely packed hollow fibers with nano-size; (b) transplanting the membrane into a non-human animal; and (c) administering an immune checkpoint inhibitor to the non-human animal; (d) separating the tumor cells and the immune cells; and (e) determining a cell viability of the tumor cells or the activity of the immune cells or determining immune checkpoint protein expression in the tumor or immune cells; wherein the immune checkpoint inhibitor has an anti-tumor effect if the cell viability of the tumor cells is significantly lower than that of the control or the activity of the immune cells is significantly higher than that of the control; or if the immune checkpoint protein expression in the tumor or immune cells is changed relative to the control.

In some embodiments, the adherent tumor cells or the suspension immune cells are seeded at a concentration of about $1\times10^4$ cells/μl to $1\times10^7$ cells/μl. In some embodiments, the adherent tumor cells or the suspension immune cells are seeded at a concentration of about $1\times10^4$ cells/μl to about $1\times10^6$ cells/μl, about $1\times10^4$ cells/μl to about $1\times10^5$ cells/μl, about $1\times10^5$ cells/μl to about $1\times10^7$ cells/μl, about $1\times10^5$ cells/μl to about $1\times10^6$ cells/μl, about $2\times10^4$ cells/μl to about $2\times10^7$ cells/μl, about $2\times10^4$ cells/μl to about $2\times10^6$ cells/μl, bout $2\times10^4$ cells/μl to about $2\times10^5$ cells/μl, about $2\times10^5$ cells/μl to about $2\times10^7$ cells/μl or about $2\times10^5$ cells/μl to about $2\times10^6$ cells/μl.

In some embodiments, the adherent tumor cells include, but are not limited to, cells of hepatocellular carcinoma, colorectal carcinoma, glioblastoma, gastric cancer, esophageal cancer, non-small cell lung cancer (NSCLC), pancreatic cancer, renal cell carcinoma, benign prostate hyperplasia, prostate cancer, ovarian cancer, melanoma, breast cancer, chronic lymphocytic leukemia (CLL), Merkel cell carcinoma, small cell lung cancer (SCLC), Non-Hodgkin lymphoma, acute myeloid leukemia (AML), gallbladder cancer and cholangiocarcinoma, urinary bladder cancer, or uterine cancer.

In some embodiments, the suspension immune cells include, but are not limited to, peripheral blood mononuclear cells (PBMCs), lymphocytes, T lymphocytes (such as CD8-positive T lymphocytes), T cells such as CD4-positive T-cell, CD8-positive T cells, CD4-positive helper T cells, CD4-positive-helper-T cells and CD8-positive cytotoxic T cells), T helper cells, monocytes, natural killer (NK) cells, macrophages, or granulocytes (such as neutrophils, basophils, and eosinophils).

The membrane comprising the adherent tumor cells and suspension immune cells are transplanted into a non-human animal. Using the method of the invention, any type of animal can be used in selection of an immune checkpoint inhibitor in vivo. For example, a common laboratory rat or mice can be used in the method of the invention to select an immune checkpoint inhibitor in a pre-clinical assay and an immunodeficient animal or a humanized mice is unnecessary.

In some embodiments, the non-human animal is a rodent (such as murine), a rabbit, a dog, a pig or a monkey. In some embodiments, the non-human animal is a murine such as rat and mice.

An interested immune checkpoint inhibitor is administered to the non-human animal for selection. In one embodiment, the immune checkpoint inhibitor is administered after 24 hours of the transplantation of step (b).

Within the present invention an immune checkpoint inhibitor is any compound inhibiting the function of an immune checkpoint protein. Inhibition includes reduction of function and full blockade. In particular the immune checkpoint protein is a human immune checkpoint protein. Thus the immune checkpoint inhibitor preferably is an inhibitor of a human immune checkpoint protein.

In some embodiments, the immune checkpoint inhibitor includes, but is not limited to, an antibody (e.g., a monoclonal antibody, chimeric antibody, humanized antibody and human antibody), an engineered binding protein, a soluble receptor, an aptamer, a peptide, or a small molecule that binds to an immune checkpoint protein.

In some embodiments, the immune checkpoint inhibitor comprises an antagonist of an inhibitory receptor. In some embodiments, the immune checkpoint inhibitor inhibits the PD1 pathway or the CTLA4 pathway. In some embodiments, the immune checkpoint inhibitor binds to PD1, PD-L1 or PD-L2. In some embodiments, the immune checkpoint inhibitor binds to CTLA4.

Preferred immune checkpoint protein inhibitors are compounds or antibodies that specifically recognize immune checkpoint proteins. A number of CTLA-4, PD1, PDL-1, PD-L2, LAG-3, BTLA, B7H3, B7H4, TIM3 and MR inhibitors are known and in analogy of these known immune checkpoint protein inhibitors, alternative immune checkpoint inhibitors may be developed in the future. For example ipilimumab is a fully human CTLA-4 blocking antibody presently marketed under the name Yervoy (Bristol-Myers Squibb). A second CTLA-4 inhibitor is tremelimumab. Examples of PD-1 inhibitors include without limitation humanized antibodies blocking human PD-1 such as lambrolizumab, or pidilizumab, as well as fully human antibodies such as nivolumab. Other PD-1 inhibitors may include presentations of soluble PD-1 ligand including without limitation PD-L2 Fc fusion protein also known as B7-DC-Ig or AMP-244 and other PD-1 inhibitors presently under investigation and/or development for use in therapy. In addition, immune checkpoint inhibitors may include without limitation humanized or fully human antibodies blocking PD-L1 such as MEDI-4736 and MIH1 and other PD-L1 inhibitors presently under investigation. According to this invention an immune checkpoint inhibitor is preferably selected from a CTLA-4, PD-1 or PD-L1 inhibitor. Known inhibitors of these immune checkpoint proteins may be used as such or analogues may be used, in particular chimerized, humanized or human forms of antibodies.

The tumor cells and the immune cells are separated. The pore size of the porous hollow fiber blocks cells from passing in to and out from the fiber. Due to the adherent property of the tumor cells and the suspension property of the immune cells, the tumor cells can be easily separated from the immune cells.

To select an immune checkpoint inhibitor, the cell viability of the tumor cells or the activity of the immune cells is determined. When the cell viability of the tumor cells is significantly lower than that of the control or the activity of the immune cells is significantly higher than that of the control, an immune checkpoint inhibitor is determined as having an anti-tumor effect.

In one embodiment, the in vitro co-culturing of step (a) takes about 1 to about 2 days. Particularly, the in vitro co-culturing of step (a) takes about 1 day.

In one embodiment, the administration of an immune checkpoint inhibitor in step (c) is conducted after about 1 to about 3 days of the transplantation of step (b). In a further embodiment, the administration of an immune checkpoint inhibitor in step (c) is conducted after about 2 days of the transplantation of step (b).

In one embodiment, the cell viability of tumor cells or the activity of immune cells or the immune checkpoint protein expression is determined after about 8 to about 15 days of the administration of step (c). In a further embodiment, the cell viability of tumor cells or the activity of immune cells or the immune checkpoint protein expression is determined after about 8 days of step (c).

Accordingly, the total time from step (b) to step (d) takes about 9 days to 18 days. In a further embodiment, the total time from step (b) to step (d) takes about 10 days.

The cell viability of tumor cells or the activity of immune cells is determined in accordance with a method known in the art. For example, the cell viability can be determined by MTT assay.

In one embodiment, the MTAM comprises one or more layers of a highly aligned and closely packed electrospun fiber assembly disclosed in US 2011264235. Particularly, the MTAM comprises the highly aligned and closely packed electrospun fiber assembly wherein at least five (5) electrospun fibers are packed together to form a single layer and an orientation of the electro spun fibers is no greater than +/−5° relative to a longitudinal axis of the assembly, wherein the electrospun fibers are connected so that the electrospun fibers are aligned and closely packed to form the single layer, and wherein the alignment of the fibers is in the orientation no greater than +/−5°. In some embodiments, the fiber assembly is composed of a polymer selected from a group consisting of ethylene oxide, polyethylene oxide, ethylene glycol, polyethylene glycol, poly(lactic acid) (PLA), poly(glycolic acid) (PGA), poly(ethylene oxide) (PEO), nylon, polyesters, polyamides, poly(amino acids), polyimides, polyethers, polyketones, polyurethanes, polycaprolactones, polyacrylonitriles, polyaramides, conjugated polymers, poly(2-methoxy, 5 ethyl (2' hexyloxy) para-phenylene vinylene) (MEH-PPV), polyphenylenevinylenes, polyarylene-vinylenes, polythienolene-vinylenes, polypyrrolo-vinylenes, polyheteroarylene-vinylenes, polyanilines, polyphenylenes, polyarylenes, polythiophenes, polypyrroles, polyheteroarylenes, polyphenylene-ethynylenes, polyarylene-ethynylenes, polythieno-ethynylenes, polyheteroarylene-ethynylenes, and mixtures thereof. In some embodiments, an average wall thickness of each fiber is about 1 to about 5 m. In some embodiment, at least 20 fibers are packed together to form the single layer. In further embodiment, at least 50 fibers pack together to form the single layer. In some embodiment, a L/d of each fiber is larger than about 100. In some embodiment, a length to diameter (L/d) ratio of each fiber is larger than about 1,000. In some embodiment, a L/d of each fiber is about 20 to about 10,000. In some embodiment, an average wall thickness of each fiber is about 1 to about 3 μm.

In one embodiment, the fibers of the hollow electrospinning fiber assembly and the MTAM have a hairy like structure which extends from inner surface of the fibers. The hair like structure grows from the inner surface of the fibers. The surface coverage ratio of the hair-like structure is about 10% to about 80%, about 10% to about 70%, about 10% to about 60%, about 10% to about 50%, about 10% to about 40%, about 10% to about 30%, about 20% to about 80%, about 20% to about 70%, about 20% to about 60%, about 20% to about 50%, about 30% to about 80%, about 30% to about 70%, about 30% to about 60%, about 40% to about 80%, about 40% to about 70%, about 50% to about 80%, or about 60% to about 80%. The surface coverage ratio can be estimated based on the TEM images. The hairy like structure in the fibers provide larger surface area and are easily scalable so that less fibers are used in various applications and thus the cost can be reduced. For example, the "hair" has an aspect ratio of up to 20:1. Embodiments of the aspect ratio of the hairy like structure include, but are not limited to, up to 15:1, up to 10:1, at least 1:1, at least 3:1 or at least 5:1, from 1:1 to 20:1.

The fibers of the MTAM-hairy are prepared in a two-fluid coxial electrospinning process, using a polymeric core solution comprising about 5 wt % to about 40 wt % polymeric solution dissolved in a solvent at a ratio of about 7:about 2 to about 9:about 1; and a polymeric shell solution comprising about 5 wt % to about 40 wt % polymeric solution dissolved in a solvent at a ratio of about 7:about 2 to about 9:about 1. In one embodiment, the solvent is a co-solvent of dichloromethane:dimethylformaldehyde (DCM:DMF). In a further embodiment, a flow rate of 3 to 10 mL/hr (core solution) and 2 to 12 mL/hr (shell solution) and/or about 80 to about 120 rpm of collection speed of the drum collector is used in the method of the present disclosure.

Embodiments of polymers used as core solution or shell solution include, but are not limited to, ethylene oxide, polyethylene oxide (PEO), ethylene glycol, polyethylene glycol (PEG), poly(lactic acid) (PLA), poly(glycolic acid) (PGA), poly(ethylene oxide) (PEO), nylon, polyesters, polyamides, poly(amic acids), polyimides, polyethers, polyketones, polyurethanes, polycaprolactones, polyacrylonitriles, polyaramides, conjugated polymers such as the electroluminescent polymer, poly(2-methoxy, 5 ethyl (2' hexyloxy) para-phenylene vinylene) (MEH-PPV), polyphenylenevinylenes, polyarylene-vinylenes, polythienolene-vinylenes, polypyrrolo-vinylenes, polyheteroarylene-vinylenes, polyanilines, polyphenylenes, polyarylenes, polythiophenes, polypyrroles, polyheteroarylenes, polyphenylene-ethynylenes, polyarylene-ethynylenes, polythieno-ethynylenes, polyheteroarylene-ethynylenes, and mixtures thereof. In some embodiments, the polymer is a biodegradable and/or bioabsorbable polymer such as polyglycolide (PGA) and its random copolymer poly(glycolide-co-lactide) (PGA-co-PLA), polyhydroxyalkyl methacrylates including ethylmethacrylate, and hydrogels such as polyvinylpyrrolidone, polyacrylamides, collagen, gelatin, alginic acid, chitin, chitosan, fibrin, hyaluronic acid, dextran and polyamino acids, or a mixture thereof. In a further embodiment, the solution is a mixture of PLA, PEO and PEG.

The "pores" on the surface of the fibers have a size ranging from about 5 nm to about 1 μm. In some embodiments, the pore size ranges from about 20 nm to about 500 nm, about 20 nm to about 400 nm, about 20 nm to about 300 nm, about 20 nm to about 200 nm, about 20 nm to about 100 nm, about 20 nm to about 80 nm, about 20 nm to about 70 nm or about 20 nm to about 60 nm. The density of the pores on the surface ranges from about 0.1% to about 30% In some embodiments, the density is from about 0.1% to about 25%, about 0.1% to about 20%, about 0.1% to about 15%, about 0.1% to about 10%, about 0.1% to about 5%, about 0.1% to about 15%, about 1% to about 30%, about 1% to about 25%, about 1% to about 20%, about 1% to about 15%, about 1% to about 10%, about 1% to about 5%, about 5% to about 30%, about 5% to about 25%, about 5% to about 20%, about 5% to about 15%, about 5% to about 10%, about 10% to about 30%, about 15% to about 25%, about or 15% to about 20%.

In one embodiment, the fibers are hollow and have pores on the inner surface. In one embodiment, the fibers are hollow and have pores on both inner and outer surfaces. Having pores on the surface(s) of the fibers, the fiber assembly is deemed having a "sponge-like" appearance.

In another embodiment, the MTAM comprises at least two layers of the fiber assembly. The MTAM has a structure wherein the layers of fiber assembly are alternatively arranged, called alternating layers. The term "alternatively" or "alternating layers" used herein means that layers of the fibers are stacked closely and are not completely aligned in the z-direction of the layers. For example, the layers of fibers in a two-layered membrane may have an "A-B" configuration when observed through the z-direction. For a three-layered membrane, the layers of fibers may have an "A-B-A" or "A-B-C" configuration when observed through the z-direction. The term "perpendicularly" or "perpendicular layers" used herein means that layers of the fibers are stacked closely and are completely aligned in the z-direction of the layers. These MTMAs are all expressed as "MTMA-al" but further suffices can be added to clearly specify the configuration and layer number of the MTMA. For example, MTMA having two layers arranged alternatively can be expressed as "MTMA-dl-al." In addition, MTMA-alternating layers may exhibit following characteristics or benefits: wastage of area minimized, higher packing density, potentially additional tubes can reduce intra system pressure, etc.

On the other hand, the MTMA has a structure wherein the layers of fiber assembly are perpendicularly arranged, called perpendicular layers. That is, MTMA has the multiple layers of fibers which are aligned in the z-direction (the direction perpendicular to the membrane plane). For example, the MTMA having two layers of fibers aligned in the z-direction is expressed by "MTMA-dl"; the MTMA having three layers of fibers aligned in the z-direction is expressed by "MTMA-tl"; etc. MTMA having more layers of fibers can also be provided. MTMA-perpendicular layers may exhibit following characteristics or benefits: larger packing density, enhanced mechanical properties, easy manipulation due to string backbone, etc.

The MTAM having the multiple layers of fibers which are aligned in the z-direction is prepared by a shell-fluid coxial electrospinning process, using a shell solution comprising about 15 wt % to about 25 wt % polymeric solution under a flow rate large than 10 mL/hr and a voltage of about 8 kV to about 11 kV, while maintaining a spinneret height of about 1-3 cm. In one embodiment, the polymeric solution is PSF/PVP solved in a co-solvent of THF and DMAC. The preparation of the MTAM-dl-al with multiple layer structures comprises in a shell-fluid coxial electrospinning process, using a shell solution comprising about 15 wt % to about 25 wt % polymeric solution under a flow rate large than 10 mL/hr and a voltage of about 8 kV to about 11 kV. In one embodiment, the polymeric solution is PSF/PVP solved in a co-solvent of THF and DMAC.

The MTAM can be enclosed in a pocket. The pocket provide protection to the MTAM and enable the MTAM operated easily.

In another aspect, the present disclosure also provides a method of selecting an immune checkpoint inhibitor in vitro, comprising (a) in vitro co-culturing adherent tumor cells and suspension immune cells within lumens of porous hollow fibers membrane of the invention; (b) adding an immune checkpoint inhibitor to the membrane; (c) separating the tumor cells and the immune cells and determining a cell viability of the tumor cells or the activity of the immune cells or determining immune checkpoint protein expression in the tumor or immune cells; wherein the immune checkpoint inhibitor has an anti-tumor effect if the cell viability of the tumor cells is significantly lower than that of the control or the activity of the immune cells is significantly higher than that of the control; or if the immune checkpoint protein expression in the tumor or immune cells is changed relative to the control.

In one embodiment, the in vitro co-culturing of step (a) takes about 1 to about 2 days. Particularly, the in vitro co-culturing of step (a) takes about 1 day.

In one embodiment, the addition of an immune checkpoint inhibitor in step (b) is conducted after about 1 to about 3 days of the transplantation of step (a). In a further embodiment, the administration of an immune checkpoint inhibitor in step (b) is conducted after about 2 days of the transplantation of step (a).

In one embodiment, the cell viability of tumor cells or the activity of immune cells or the immune checkpoint protein expression is determined after about 8 to about 15 days of the administration of step (b). In a further embodiment, the cell viability of tumor cells or the activity of immune cells or the immune checkpoint protein expression is determined after about 8 days of step (b).

Accordingly, the total time from step (b) to step (c) takes about 9 days to 18 days. In a further embodiment, the total time from step (b) to step (c) takes about 10 days.

In the in vitro method, the embodiments of the immune checkpoint inhibitor, MTAM, adherent tumor cells, suspension immune cell, cell viability assay and administration etc. are described herein.

The methods of the present disclosure can improve the accuracy of evaluating anti-cancer drugs and establish a rapid, reliable and low-cost anti-cancer drug screening platform. The method of present disclosure is a feasible animal model for screening immune checkpoint inhibitor and provides advantages such as rapid, low cost and high take care.

The following examples are presented by way of illustration and are not intended to limit the scope of the subject matter disclosed herein.

EXAMPLES

Example 1 In Vitro Study of Using the MTAMs

Figure 1:
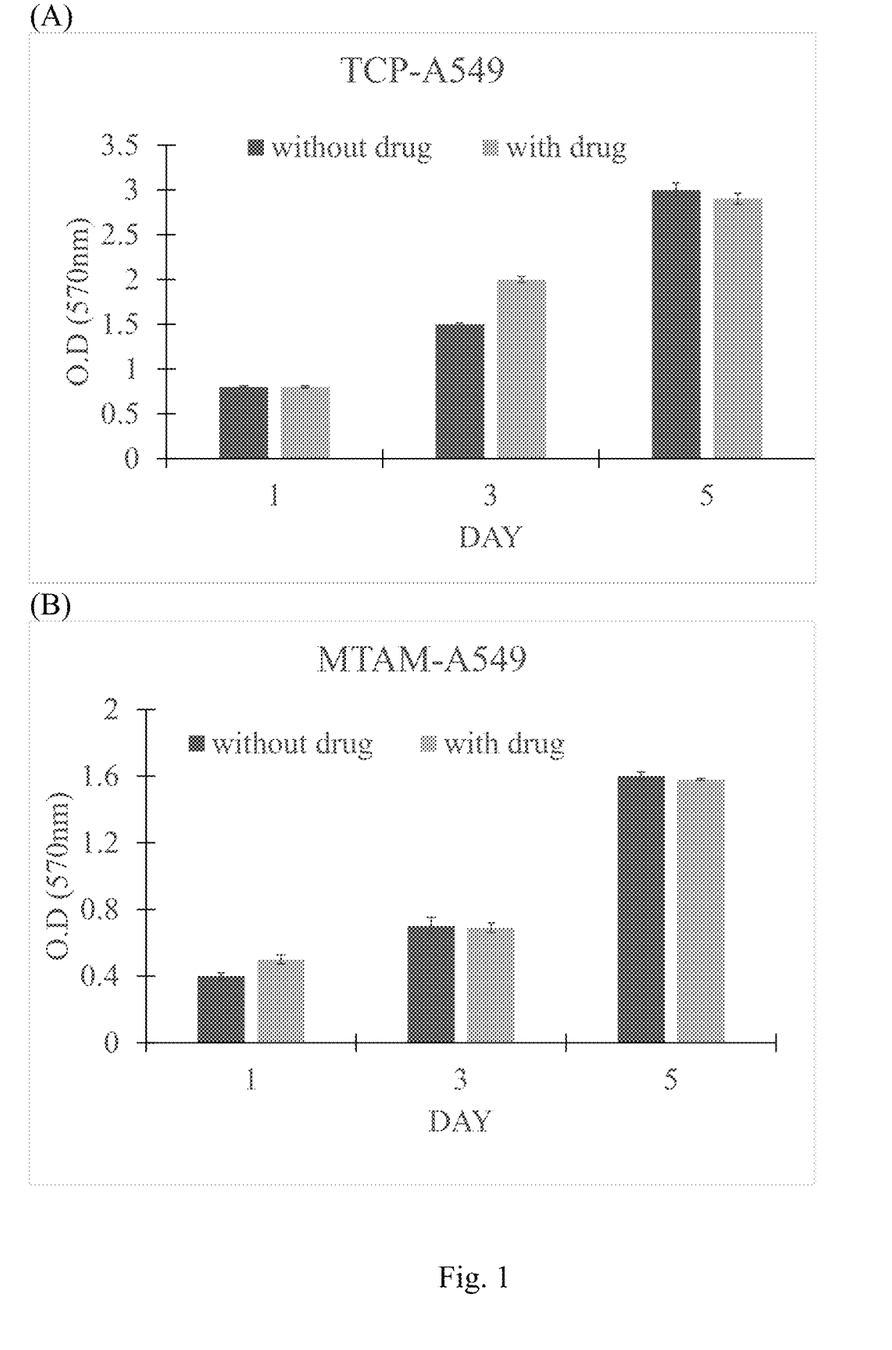

A549 cells ($1\times10^5$ cells/5 μl) and PBMC ($2\times10^5$ cells/5 μl), alone and in combination, were cultured in a tissue culture plate (TCP) and the lumens of the fibers of the MTAMs as disclosed in US 2011264235, respectively. An anti-PD-1 drug was added to the tissue culture plate and the membrane every day. As shown in FIGS. 1 (A) and (B), the cell viability of A549 cells cultured in TCP and membrane lumens increases depending on culture days and the addition of the anti-PD-1 drug did not affect cell viability (p>0.05). As shown in FIGS. 1 (C) and (D), the cell viability of PBMC cells cultured in TCP and membrane lumens decreases depending on culture days and the addition of the anti-PD-1 drug did not affect cell viability (p>0.05).

FIGS. 1 (E) and (F) show that A549 cells and inactivated T cells were co-cultured in TCP and the growth thereof is similar to that of the control. The cell viability of the co-culture on the fifth day reduces by 8% (no addition of anti-PD-1 drug) and 12% (addition of anti-PD-1 drug) in comparison with the culture comprising one type of cells. The addition of anti-PF-1 has no significant difference. A549 cells and inactivated T cells co-cultured in the membrane exhibit similar results.

FIGS. 1 (G) and (H) show that A549 cells and activated T cells were co-cultured in TCP and the growth thereof is similar to that of the control (one type of cell). The cell viability of the co-culture on the fifth day reduces by around 14% (no addition of anti-PD-1 drug) and around 31% (addition of anti-PD-1 drug) in comparison with the control. The addition of anti-PF-1 exhibits significant difference. A549 cells and activated T cells co-cultured in the membrane exhibit reduced cell viability by around 19% (no addition of anti-PD-1 drug) and around 70% (addition of anti-PD-1 drug), respectively.

The MTAM-hairy was also used in the in vitro study as mentioned above. It was found that A549 cells and activated T cells co-cultured in the MTAM exhibit reduced cell viability.

Figure 2:
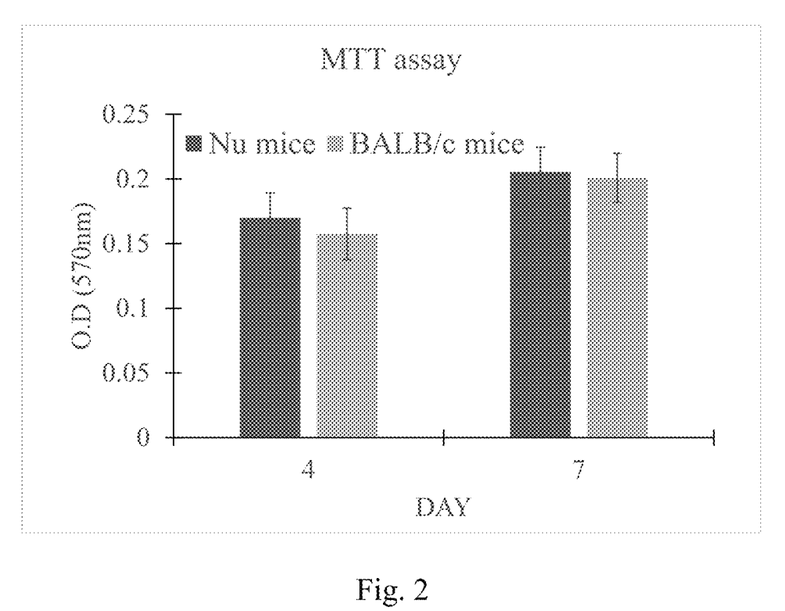
FIG. 2 shows that the cell viability in the membranes of the nude mice and the common mice increases depending on the time and there is no significant difference.
Figure 3:
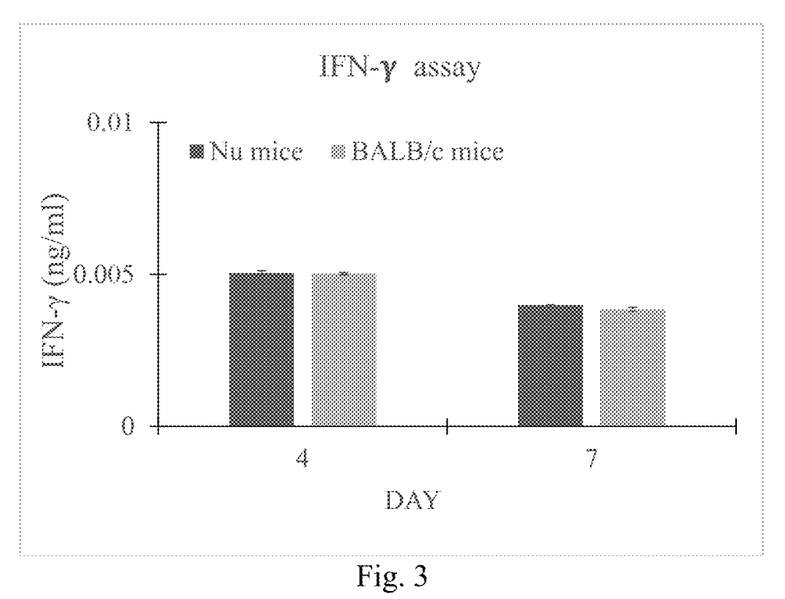
FIG. 3 shows that the interferon-7 levels in the membranes of the nude mice and the common mice are very low.
Figure 4:
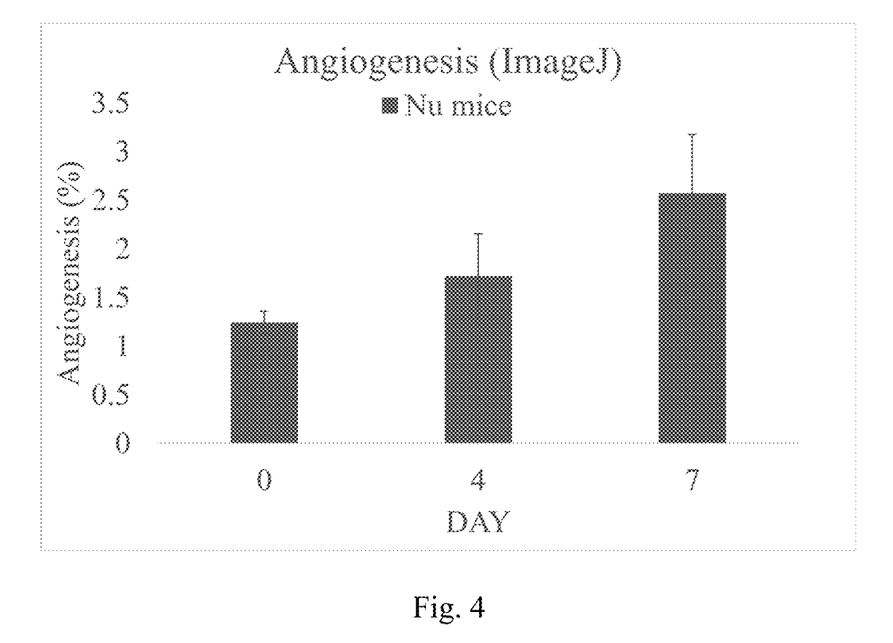
FIG. 4 shows that the blood vessel numbers in the nude mice and the common mice increase depending on the time.
Figure 5:
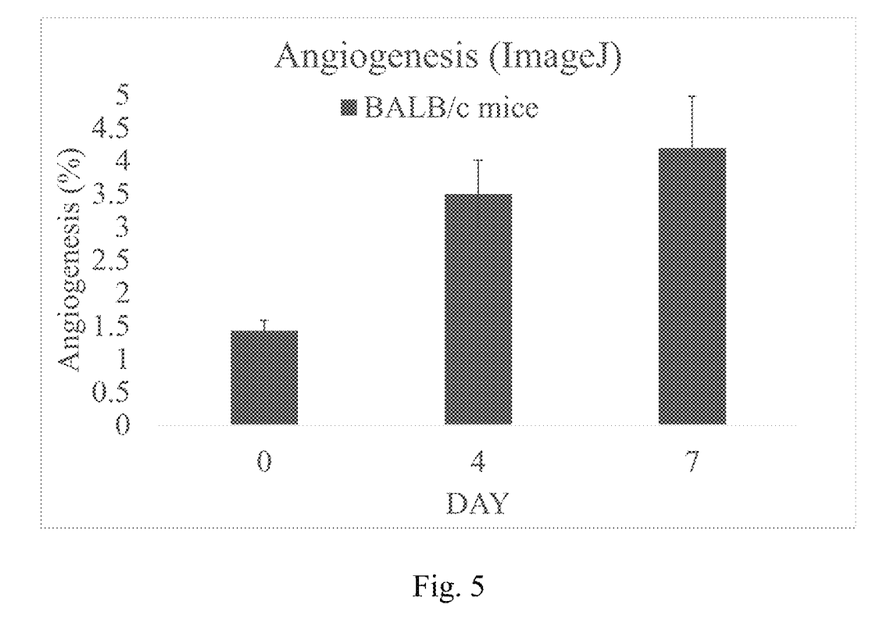
FIG. 5 shows that the blood vessel numbers in the common mice increase around 38% than the nude mice at the seventh day.

Example 2 Selection in Animal Model $10^6$ tumor cells (A549 cells) were transplanted to the lumens of the MTAMs as disclosed in US 2011264235. After 24 hours, the membranes were implanted to nude mice (lack of T cells) and common mice with a complete immune system (BALA/c mice). The angiogenesis, cell viability and interferon-γ level were measured. As shown in FIG. 2, the cell viability in the membranes of the nude mice and the common mice increases depending on the time and there is no significant difference. The interferon-γ levels in the membranes of the nude mice and the common mice are very low (see FIG. 3). FIGS. 4 and 5 show that the blood vessel numbers in the nude mice and the common mice increase depending on the time and the blood vessel numbers in the common mice increase around 38% than the nude mice at the seventh day.

Example 3 In Vivo Animal Study of Using the MTAM

A549 cells ($1\times10^5$ cells/5 μl) and PBMC ($2\times10^5$ cells/5 μl) were transplanted into the lumens of the fibers of the MTAMs as disclosed in US 2011264235 and the two ends of the membrane were sealed to avoid cells from passing out the fibers. The membrane was cultured in a culture dish with the RPMI-1640 medium. After 24 hours, the tumor cells were adhered to the fiber inner wall.

Figure 6:
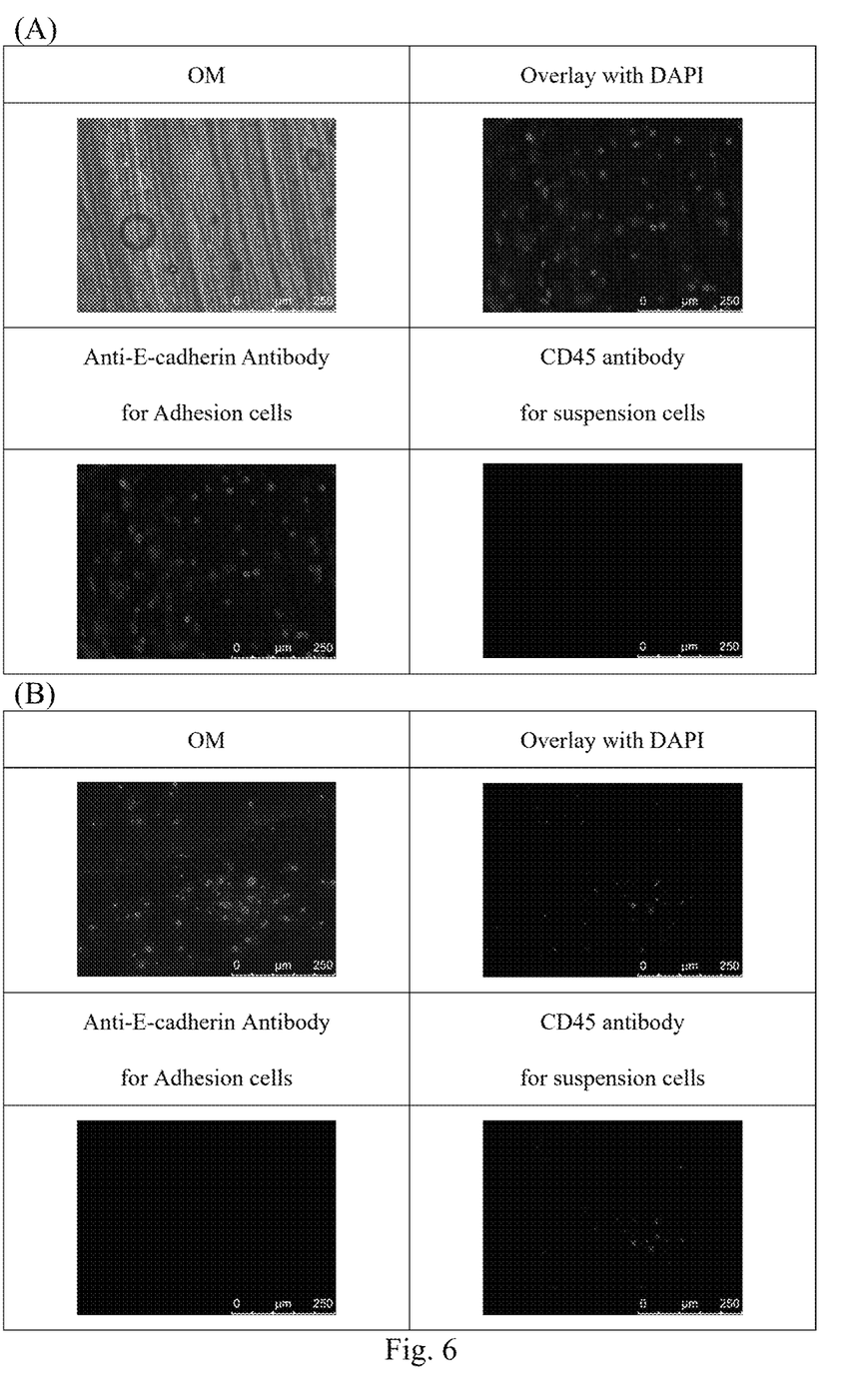

BALA/c mice (7 weeks old) were used in the animal study. The above resulting membrane was transplanted into the back of the mice. After 24 hours, an anti-PD-1 drug (200 µg/mice) was administered to the mice at every other day for 15 days. The membranes were taken from the mice at 6, 9, 12 and 15 days to observe the angiogenesis. The membranes were put in MTT (0.5%; Sigma, USA) solution (1,000 µl PBS+200 µl MTT). After 30 minutes, the membranes were taken and centrifuged at 670 g for 10 minutes to isolate and collect PBMC. After the centrifugation, the suspension sample was taken and put in the slide. The slide and the membrane were stained by fluorescent and then observed by fluorescence microscope. As shown in FIGS. 6 (A) and (B), the adherent tumor cells (A549) were stayed on the inner wall of the fibers of the membrane and suspension cells (PBMC) were isolated. Then, the membranes were put in 500 µl DMSO solution; after 24 hours, 100 µl of the solution sample of each membrane was put in 96-well plate and the absorbance (570 nm) was measured by ELISA reader.

Figure 7:
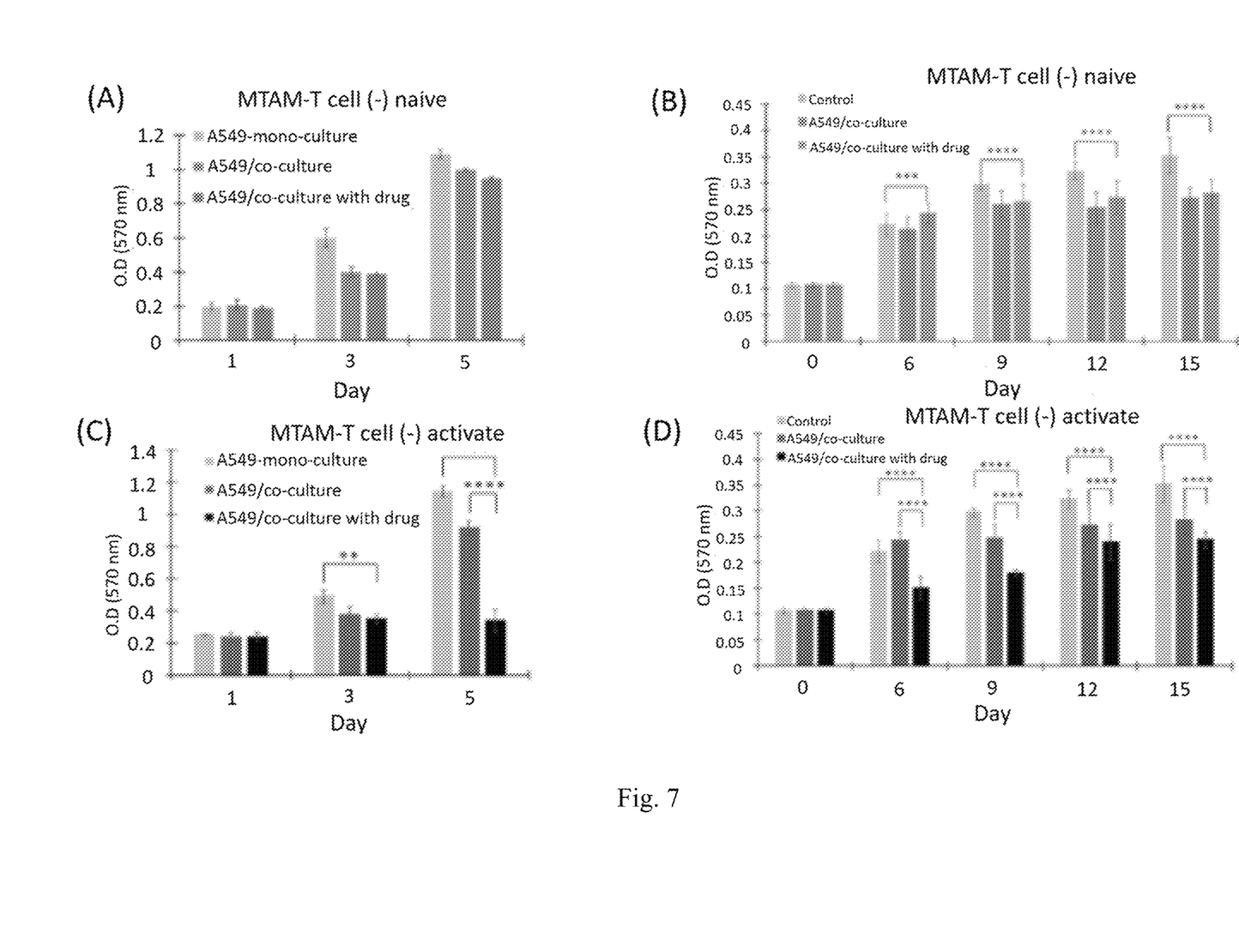

FIG. 7 (A) to (D) show cancer cell co-culture with naïve of activate PBMC treated with anti-PD1 antibody.

The MTAM-hairy was also used in the in vivo animal study as mentioned above. It was found that the MTAM-hairy exhibited good effect in selection of an anti-tumor drug.

What is claimed is:

1. A method of selecting an immune checkpoint inhibitor in vivo, comprising:
   (a) in vitro co-culturing adherent tumor cells and suspension immune cells within lumens of a microtube array membrane (MTAM), wherein the MTAM comprises an electrospun fiber assembly having highly aligned and closely packed hollow fibers with nano-size;
   (b) transplanting the MTAM into a non-human animal with a complete immune system; and
   (c) administering an immune checkpoint inhibitor to the non-human animal;
   (d) separating the adherent tumor cells and the suspension immune cells, thereby allowing the adherent tumor cells to stay on inner walls of the fiber of the MTAM; and
   (e) determining a cell viability of the adherent tumor cells or the activity of the suspension immune cells or determining immune checkpoint protein expression in the adherent tumor cells or the suspension immune cells;
   wherein the immune checkpoint inhibitor has an anti-tumor effect if the cell viability of the adherent tumor cells is significantly lower than that of the control or the activity of the suspension immune cells is significantly higher than that of the control; or if the immune checkpoint protein expression in the tumor or immune cells is changed relative to the control.

2. The method of claim 1, wherein the adherent tumor cells or the suspension immune cells are seeded at a concentration of about $1\times10^4$ cells/µl to $1\times10^7$ cells/µl.

3. The method of claim 1, wherein the adherent tumor cells are cells of hepatocellular carcinoma, colorectal carcinoma, glioblastoma, gastric cancer, esophageal cancer, non-small cell lung cancer (NSCLC), pancreatic cancer, renal cell carcinoma, benign prostate hyperplasia, prostate cancer, ovarian cancer, melanoma, breast cancer, chronic lymphocytic leukemia (CLL), Merkel cell carcinoma, small cell lung cancer (SCLC), Non-Hodgkin lymphoma, acute myeloid leukemia (AML), gallbladder cancer and cholangiocarcinoma, urinary bladder cancer, or uterine cancer.

4. The method of claim 1, wherein the suspension immune cells include peripheral blood mononuclear cells (PBMCs), lymphocytes, monocytes, macrophages, or granulocytes.

5. The method of claim 1, wherein the non-human animal is a rodent, a rabbit, a dog, a pig or a monkey.

6. The method of claim 1, wherein the immune checkpoint inhibitor inhibits the PD1 pathway or the CTLA4 pathway.

7. The method of claim 6, wherein the immune checkpoint inhibitor is an antibody, an engineered binding protein, a soluble receptor, an aptamer, a peptide, or a small molecule that binds to an immune checkpoint protein.

8. The method of claim 1, wherein the immune checkpoint inhibitor binds to PD1, PD-L1, PD-L2 or CTLA4.

9. The method of claim 1, wherein the in vitro co-culturing of step (a) takes about 1 to about 2 days.

10. The method of claim 1, wherein the administration of an immune checkpoint inhibitor in step (c) is conducted after about 1 to about 3 days of the transplantation of step (b).

11. The method of claim 1, wherein the cell viability of the adherent tumor cells or the activity of the suspension immune cells or the immune checkpoint protein expression is determined after about 8 to about 15 days of the administration of step (c).

12. The method of claim 1, wherein the total time from step (b) to step (d) takes about 9 days to 18 days.

13. The method of claim 1, wherein the total time from step (b) to step (d) takes about 10 days.

14. The method of claim 1, wherein the MTAM comprises one or more layers of a highly aligned and closely packed electrospun fiber assembly, wherein at least five (5) electrospun fibers are packed together to form a single layer and an orientation of the electro spun fibers is no greater than +/−5° relative to a longitudinal axis of the assembly, wherein the electrospun fibers are connected so that the electrospun fibers are aligned and closely packed to form the single layer, and wherein the alignment of the fibers is in the orientation no greater than +/−5°.

15. The method of claim 1, wherein the MTAM has one or more layers of the electrospun fiber assembly, wherein the fibers have nanoscale hair like structures extended from an inner surface thereof.

16. The method of claim 1, wherein the MTAM comprises at least two layers of the fiber assembly.

17. The method of claim 16, wherein the MTAM has a structure wherein the layers of the fiber assembly are alternatively or perpendicularly arranged.

18. The method of claim 1, wherein the MTAM is enclosed in a pocket.

19. The method of claim 4, wherein the suspension immune cells comprise T cells or natural killer (NK) cells.

20. The method of claim 19, wherein the suspension immune cells comprise T helper cells.

21. The method of claim 19, wherein the suspension immune cells comprise CD4-positive T-cell, CD8-positive T cells, CD4-positive helper T cells, or CD8-positive cytotoxic T cells.

* * * * *